US008984866B2

(12) United States Patent
Miebach et al.

(10) Patent No.: US 8,984,866 B2
(45) Date of Patent: Mar. 24, 2015

(54) EXHAUST GAS AFTERTREATMENT SYSTEM

(75) Inventors: Rolf Miebach, Bruehl (DE); Stephan Schraml, Koenigswinter (DE); Peter Broll, Bergisch-Gladbach (DE); Andreas Geisselmann, Offenbach (DE); Stefan De Buhr, Hanau-Mittelbuchen (DE); Stéphanie Frantz, Lörrach (DE); Anke Woerz, Brussels (BE); Frank-Walter Schuetze, Haibach (DE)

(73) Assignees: Umicore AG & Co. KG, Hanau-Wolfgang (DE); Deutz AG, Cologne (DE)

( * ) Notice: Subject to any disclaimer, the term of this patent is extended or adjusted under 35 U.S.C. 154(b) by 214 days.

(21) Appl. No.: 13/375,083

(22) PCT Filed: May 28, 2010

(86) PCT No.: PCT/EP2010/003260
§ 371 (c)(1),
(2), (4) Date: Jan. 31, 2012

(87) PCT Pub. No.: WO2010/139429
PCT Pub. Date: Dec. 9, 2010

(65) Prior Publication Data
US 2012/0117949 A1 May 17, 2012

(30) Foreign Application Priority Data

May 30, 2009 (DE) .................. 10 2009 023 550

(51) Int. Cl.
*F01N 3/00* (2006.01)
*F01N 3/02* (2006.01)
(Continued)

(52) U.S. Cl.
CPC ............ *F01N 3/2033* (2013.01); *F01N 3/0231* (2013.01); *F01N 3/106* (2013.01);
(Continued)

(58) Field of Classification Search
CPC ....... F01N 3/0231; F01N 3/025; F01N 3/106; F01N 3/2033; F01N 2240/14; F01N 2510/06; F01N 2510/068; F01N 2510/0682; F01N 2610/03; Y02T 10/26

USPC ........... 60/274, 286, 295, 299, 300, 301, 303, 60/311
See application file for complete search history.

(56) References Cited

U.S. PATENT DOCUMENTS 3,739,576 A * 6/1973 Chamberlain .................. 60/738
4,576,617 A * 3/1986 Renevot .......................... 95/279
(Continued)

FOREIGN PATENT DOCUMENTS

DE 102008026477 A1 12/2009
DE 102008063515 A1 6/2010
(Continued)

OTHER PUBLICATIONS

"Autoabgaskatalysatoren", Hagelüken, et al., 2nd Edition 2005, pp. 46-51.
(Continued)

*Primary Examiner* — Audrey K Bradley
(74) *Attorney, Agent, or Firm* — Smith, Gambrell & Russell, LLC (57) ABSTRACT

An exhaust gas post treatment system for an internal combustion engine, including an intake device for taking hydrocarbons into an exhaust gas pipe carrying the exhaust process gas from the internal combustion engine and a treatment device through which exhaust process gas flows downstream of the intake location and which increases the exhaust process gas temperature by oxidation of the hydrocarbons taken in. An exhaust gas post treatment system and a method for operating the same, in that the treatment device has catalytically coated components, the hydrocarbons are at least partly evaporated in the intake device and are modified chemically by cracking reactions and/or by partial oxidation, and the proportion of platinum, at least in a subregion of the catalytic coating of the components, is less than 50% of the overall mass of all the catalytically active substances in this sub region of the coating.

31 Claims, 4 Drawing Sheets

(51) Int. Cl.
  *F01N 3/10*    (2006.01)
  *F01N 3/20*    (2006.01)
  *F01N 3/023*   (2006.01)

(52) U.S. Cl.
  CPC ......... *F01N2240/14* (2013.01); *F01N 2510/06* (2013.01); *F01N 2510/0682* (2013.01); *F01N 2610/03* (2013.01); *Y02T 10/26* (2013.01)
  USPC .................. 60/295; 60/286; 60/299; 60/300; 60/303; 60/311

(56) References Cited

U.S. PATENT DOCUMENTS

| | | | |
|---|---|---|---|
| 5,094,075 | A | 3/1992 | Berendes |
| 5,826,428 | A * | 10/1998 | Blaschke ........................ 60/303 |
| 7,032,376 | B1 | 4/2006 | Webb et al. |
| 8,006,485 | B2 | 8/2011 | Twigg et al. |
| 2008/0047261 | A1 * | 2/2008 | Han et al. ........................ 60/299 |
| 2008/0092532 | A1 * | 4/2008 | Bareis et al. .................... 60/303 |
| 2008/0127638 | A1 | 6/2008 | Vaarkamp et al. |
| 2009/0288402 | A1 | 11/2009 | Voss et al. |
| 2011/0023457 | A1 | 2/2011 | Miebach et al. |
| 2001/0258987 | | 10/2011 | Miebach et al. |

FOREIGN PATENT DOCUMENTS

| | | | |
|---|---|---|---|
| EP | 1537304 B1 | 2/2007 | |
| EP | 1857648 A1 | 11/2007 | |
| EP | 1949953 A1 * | 7/2008 | ............. B01D 53/94 |
| GB | 2295561 A * | 6/1996 | ............. B01D 53/94 |
| WO | 2008/088649 A1 | 7/2008 | |

OTHER PUBLICATIONS

International Search Report for PCT/EP2010/003260 mailed Sep. 1, 2010 (in English).
English translation of Chinese Office Action dated Jun. 26, 2013 for Application No. CN 201080022659.7.

* cited by examiner

EXHAUST GAS AFTERTREATMENT SYSTEM

The invention relates to an exhaust gas aftertreatment system for an internal combustion engine. It contains in particular an introduction device for the introduction of hydrocarbons (HCs) into an exhaust pipe carrying the process exhaust gas of the internal combustion engine, and a treatment device, through which process exhaust gas flows downstream of the introduction location and which increases the process exhaust gas temperature as a result of the oxidation of the hydrocarbons introduced.

An exhaust gas aftertreatment system of this type is known from EP1537304. This exhaust gas aftertreatment system is designed for connection to compression ignition engines, such as diesel engines. In this case, the subject of this document is concerned with reducing the overall emissions of such a compression ignition engine. For this purpose, it is proposed to operate the compression ignition engine in different operating modes and to provide a catalytic component from a stipulated selection, which has at least one platinum catalyst, in the exhaust gas system. It is generally known that platinum catalysts can be used in order to generate specific stipulated catalytic reactions.

It is generally known to use, for example, catalytic burners for conventional thermal regeneration systems for particle filters. In this case, mostly, a metering of liquid HC into the exhaust gas is employed, together with a diesel oxidation catalyst which converts these hydrocarbons and delivers thermal energy for raising the exhaust gas temperature to approximately 600°. Preferably, the fuel is injected into the exhaust gas line between the internal combustion engine and catalyst. In passenger car applications, the hydrocarbons are usually introduced into the combustion space of the internal combustion engine via late post-injection which is no longer implemented thermally. All these systems use catalysts which contain platinum to a considerable extent. Furthermore, the substantially more cost-effective palladium is also employed, but, predominantly for the thermal stabilization of the catalyst, with a mass fraction of at most approximately 50% of the overall noble metal.

It can be gathered from EP1857648 that a so-called "fuel processor" can be used to generate heat in the exhaust gas system of a diesel engine. In this case, this treatment device can consist of an oxidation catalyst and a reformation catalyst, which can use fuel introduced into the exhaust gas, if appropriate, to heat a downstream particle trap.

The object on which the present invention is based is to specify an exhaust gas aftertreatment system and a method for operating an exhaust gas aftertreatment system of this type, which is able to heat the exhaust gas of an internal combustion engine and which, moreover, can be implemented cost-effectively.

This and further objects which are not specified in greater detail here but are obvious from the prior art are achieved by the specification of an exhaust gas aftertreatment system for an internal combustion engine, which contains a device for the introduction of hydrocarbons into an exhaust pipe carrying the process exhaust gas of the internal combustion engine, the hydrocarbons in the device being at least partially evaporated and being modified chemically by crack reactions and/or by partial oxidation, and also has a treatment device, through which the process exhaust gas flows downstream of the introduction location and which increases the process exhaust gas temperature as a result of the oxidation of the hydrocarbons introduced which are partially evaporated and chemically modified by crack reactions and/or by partial oxidation, wherein the device for the at least partial evaporation and for the chemical modification of the hydrocarbons which is caused by crack reactions and/or by partial oxidation is an arrangement which has a burner (2) with a supply device for fuel and air and also a combustion chamber (3) and an exhaust gas line (4) which is provided with an injection device (5) for hydrocarbons and which issues into the exhaust pipe (6) at the introduction location, and the treatment device which increases the process exhaust gas temperature has catalytically coated components, the platinum fraction, at least in a part-region of the catalytic coating of the components, amounting to less than 50% of the overall mass of all the catalytically active substances in this part-region of the coating, and the catalytically coated components being catalyst substrates or particle filters which may in each case be differently coated unitarily or zonally.

This embodiment is based on the surprising recognition that an exhaust gas aftertreatment system, which, using a suitable introduction device, already provides the hydrocarbons in a form evaporated in a particular way and in a form modified chemically by crack reactions and/or by partial oxidation, can operate with a considerably smaller platinum content in the catalytic constituents of the following treatment device than is the case in conventional hydrocarbon mixtures. One aim of the introduction of the hydrocarbons and conversion in the treatment device is in this case to burn continuously or discontinuously the soot particles filtered out of the process exhaust gas of the internal combustion engine in a particle filter. It was thus not foreseeable that this can be implemented so extremely successfully and nevertheless cost-effectively by the device according to the invention.

Within the exhaust gas aftertreatment system, the part-region of the catalytic coating of the components of the treatment device comprises at least 20%, preferably 30%, further preferably 50% and particularly preferably 100%, of the overall mass of the catalytic coating on the components of the treatment device which increases the process exhaust gas temperature. The catalytic coating of the components is understood as meaning those coatings which have a gradient of greater than +1 K/cm, preferably greater than +2.5 K/cm and particularly preferably greater than +10 K/cm, along the direction of flow during the phase of heating the exhaust gas. This ensures reliable operation of the system.

Further catalytically active substances are located in the part-region of the catalytic coating of the treatment device; in particular, palladium may be present. The catalytic coating of the part-region preferably contains noble metals having a total noble metal mass based on the component or substrate volume in the range from 0.1-10 g/L, preferably 0.5-5 g/L and particularly preferably in the range from 0.7-3.5 g/L.

In an especially advantageous refinement, there is provision and it is possible for the noble metal fraction of the catalytic coating of the part-region of the treatment device to amount to less than 10%, preferably less than 5% and particularly preferably less than 3% of the overall mass of the catalytic coating of the part-region in question. This means, in the limiting case, that no noble metal at all is present. In this case, preferably, other catalytically active substances are present, which perform the catalytic functions.

In one refinement, the part-region of the catalytic coating of the treatment device therefore contains further catalytically active substances. In a preferred embodiment, the fraction of the noble metals in the overall mass of the catalytically active substances amounts, however, to more than 10%, particularly preferably more than 30% and very particularly preferably 100%.

If palladium is one of the noble metals present in the part-region, the palladium fraction of the catalytic coating of the part-region of the treatment device can amount to at least 50%, preferably at least 75% and particularly preferably 100%, of the overall mass of all the noble metals of the part-region of the treatment device.

If platinum is present in the part-region, it can be assumed that the platinum fraction in the part-region of the catalytic coating of the components amounts to less than 50%, more preferably less than 30% and very particularly preferably less than 20% or extremely preferably less than 10%, of the overall mass of all the catalytically active substances in this part-region of the coating. In a particular embodiment, the platinum content amounts to less than 5%, preferably less than 3% and particularly preferably less than 1%, of the overall mass of all the catalytically active substances of the part-region, i.e. in the limiting case 0%.

Within the context of the present invention, catalytically active substances are understood as meaning active metals, i.e. transition metals from Groups VB, VIIB, VIIB, VIII, IB and IIB and in particular also noble metals which are able, as a constituent of a catalytic coating, to oxidize a hydrocarbon mixture resulting from the evaporation of diesel fuel in the engine exhaust gas with a volume concentration of 1000 ppm C1 at least predominantly to form carbon dioxide and water, given an active metal concentration selected in the range from 0.1-500 g/L catalyst space, preferably 0.2-200 g/L and particularly preferably 0.5-100 g/L, at a temperature of 350° C. The catalytically active substances or the active metals can be present in elemental form and/or in the form of compounds, in particular oxides.

In addition to the catalytically active substances or active metals addressed in the introduction, the catalytic coating of the treatment device can contain further components, which, for example, promote the fine distribution of the catalytically active substances or active metals and generally support or even enable the mechanism of action thereof. These components include, in particular, pure or mixed oxides of aluminum, silicon, titanium, zirconium or of the rare earth metals, wherein admixtures of in particular alkali metal elements and alkaline earth metal elements, halides and/or sulfur or phosphorus compounds can further modify the properties thereof, such as e.g. the acidity. Further admixtures are possible in principle. Furthermore, use is frequently made of storage components such as, e.g., zeolites and/or cerium/zirconium mixed oxides ["Autoabgaskatalysatoren", Hagelüken et. al., expert publishers, 2nd Edition, 2005].

The catalytically active substances are usually arranged on these further components or selective parts thereof. Noble metals such as, e.g., platinum or palladium are present predominantly in the form of small particles having a diameter in the range from 0.1 to 100 nm, preferably 0.2-50 nm and further preferably 0.5-25 nm.

The catalytic coating as a whole forms a highly porous structure with a high surface area. Typical BET surface areas are in the range from 1-300 m$^2$/g, preferably 50-200 m$^2$/g and particularly preferably in the range from 80-160 m$^2$/g; pore volumes are in the range from 0.1-2 g/L, preferably 0.2-1.5 g/L and particularly preferably in the range from 0.25-1 g/L.

The catalytic coating is generally applied to the component to be coated in one or more steps in the form of a slurry ["Autoabgaskatalysatoren", Hagelüken et. al., expert publishers, 2nd Edition, 2005]. In individual cases, solutions or vapor processes can also be used. Ceramic or metallic substrates in the form of honeycomb bodies or other structures such as, e.g., foams, corrugated matting or nonwovens are frequently coated, but in principle it is also possible to coat smooth components such as, e.g., inner walls of pipes. The substrates may be simple throughflow substrates or else substrates having a filter function, into which the medium to be filtered is conducted, e.g., through a porous ceramic wall or a metal nonwoven.

The function of the catalytic coating consists in converting the oxidizable components, in particular hydrocarbons (HCs), metered in the inflow gas as far as possible to form carbon dioxide and water, and to generate heat in the process. Parts of these components from the inflow gas can be stored intermediately in adsorbed or liquid form in the coating, particularly functional coatings being distinguished by the fact that the functionality is impaired as little as possible by such storage effects. In use, particularly functional catalytic coatings are characterized by low hydrocarbon concentrations at the outlet and small radial temperature fluctuations, in particular in the inlet region of the part-region of the treatment device which increases the temperature, these properties being maintained as constantly as possible over the entire regeneration interval of typically about 10 to 20 minutes.

The catalytic coating is preferably applied in an amount of 5-300 g/L, preferably 10-150 g/L and particularly preferably in the range from 20-130 g/L component or substrate volume. The coating preferably has a layer thickness in the range from 5 to 200 μm, preferably 10-100 μm and particularly preferably in the range from 20-60 μm. If noble metal is used as the active component, the total noble metal mass based on the component or substrate volume is preferably in the range from 0.1-10 g/L.

Common active metals or catalytically active substances can have considerably higher proportions and, in the extreme case, make up the entire coating.

Particularly if palladium is used in the catalytic coating of the part-region of the treatment device, the platinum mass fraction of the catalytically active substances can amount to 0% in the limiting case. This was in no way assumed to be the case at the time of the invention. Large fractions of expensive platinum are often present in these catalysts oxidizing the hydrocarbons.

Advantages of a platinum-free coating are:
On average over the long term, the price of palladium is considerably lower than that of platinum; base metals are again considerably more cost-effective.
A system having very low $NO_2$ emissions is realized ($NO_2$ is toxic and is limited in terms of emissions, while in underground workings and in inside spaces $NO_2$-forming systems are often not permissible).
Surprisingly, despite the known sulfur sensitivity of palladium, an increased sulfur tolerance is achieved, as compared to platinum-containing coatings. As compared with platinum, palladium and common active metals have a markedly lower effect upon the oxidation of $SO_2$ into $SO_3$, and accordingly the sulfates probably relevant for the sulfur poisoning of catalysts are formed presumably in smaller quantities.

The exhaust gas temperature is preferably increased using a so-called diesel oxidation catalyst. This means that the part-region of the catalytic coating of the components of the treatment device increasing the process exhaust gas temperature represents part or the entirety of such a diesel oxidation catalyst. In a particular embodiment, however, the exhaust gas temperature can be increased in addition or exclusively using a filter to be regenerated. In the limiting case, no diesel oxidation catalyst is required at all and the hydrocarbon mixture is conducted directly onto the catalytically coated particle filter, which in this case represents the sole catalytically coated component of the treatment device increasing the process exhaust gas temperature. In this case, it is of course desirable that temperatures which are sufficient for regeneration are achieved as soon as possible after entry into the filter.

The catalytically coated components increasing the process exhaust gas temperature are catalyst substrates or particle filters which may in each case be differently coated unitarily or zonally. Coating solutions with one or more catalytically active layers lying above one another are also conceivable. Within the scope of the invention, it is possible, for example, to configure or construct a diesel oxidation catalyst or another catalyst, which can also take over other tasks, with the catalytic coating as an independent component or else to integrate the diesel oxidation catalyst together with the catalytic coating ultimately into the particle filter. Of course, combination solutions of the two embodiments described are also possible and provided within the scope of the invention.

In a development of the invention, the part-region of the treatment device preferably comprises an entire catalytically coated component increasing the process exhaust gas temperature or part of such a component or parts of a plurality of such components. Each component may therefore have a plurality of part-regions which have different properties, one part-region of which possesses the properties specified above. This part-region does not necessarily have to be the first part of the respective component, but should be arranged at least, in the direction of flow, in the front part of a zonal coating of such a component, in particular of a particle filler.

Figure 2:
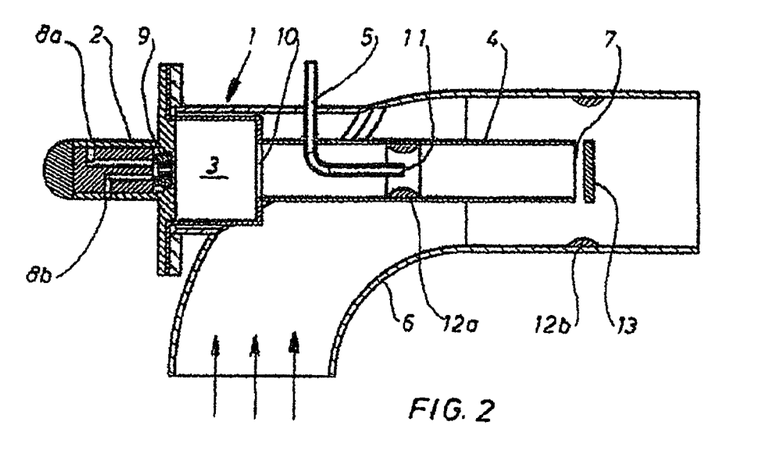
FIG. 2 shows a first version of the evaporator device cooperating with an exhaust pipe.

The introduction device for the at least partial evaporation and for the chemical modifications of the hydrocarbons which are caused by crack reactions and/or by partial oxidation is, in a further refinement, an arrangement which has a burner with a supply device for fuel and air and also a combustion chamber and an exhaust gas line which is provided with an injection device for hydrocarbons and which issues into the exhaust pipe at the introduction location (FIG. 2). The injected hydrocarbons are in the form of liquid fuel which is preferably the same fuel, for example diesel fuel, which is also injected by means of the supply device of the burner. Basically, however, it is possible also to use a gaseous fuel, for example natural gas, in order to operate the burner. The separate introduction of the additional fuel via the injection device affords the advantage that, in contrast to the prior art, a fuel quantity required, for example, for a process no longer has to be delivered overall by means of the supply device of the burner, but, instead, a part-quantity of the overall fuel required is delivered, downstream of the burner, as a "secondary fuel quantity". This secondary fuel quantity is then finally prepared and/or burnt in a fully controlled manner. The corresponding operating method is distinguished basically in that the burner makes available a basic thermal power, the lower limit of which is stipulated by the provision of a sufficient energy quantity for the evaporation of the fuel quantity injected into the exhaust gas line. This embodiment or this method for operating an exhaust gas aftertreatment system can, as a result, be implemented markedly more cost-effectively on a conventional exhaust gas aftertreatment system.

In a development of the invention, an issue (11) of the injection device (5) in the exhaust gas line (4) has an atomizer nozzle, in particular a pressure atomizer nozzle or an airstream atomizer nozzle. By means of the pressure atomizer nozzle, the liquid fuel is atomized solely as a result of the pressure of the fuel. Alternatively, however, the injection device may also be configured as an airstream atomizer nozzle. In this case, the airstream atomizer nozzle is operated so that the fuel is introduced with a small air quantity into the exhaust gas line. When an airstream atomizer nozzle is operating normally, for example, 20 L/min of air and 2 $cm^3$/min of fuel would be conveyed in order to provide an ignitable fuel/air mixture, whereas, with the airstream atomizer operated according to the invention with 20 L/min of air, up to 100 $cm^3$/min of fuel are atomized. Such a rich fuel/air mixture is primarily non-ignitable.

In a further refinement, a Venturi device is arranged in the exhaust gas line in the region of an issue of the injection device. This Venturi device causes a rapid intermixing of the part-streams of exhaust gas and of evaporated fuel which meet one another.

In a further refinement of the invention, the burner with the combustion chamber, the exhaust gas line and the injection device are integrated into a housing, and the housing is adapted to the exhaust pipe. A structural unit is thus provided which can be built onto different exhaust pipes. In this case, the housing may ideally be configured so that, when used on an internal combustion engine, it can be built onto the exhaust gas system preferably near the internal combustion engine, for example directly behind the exhaust gas collecting line or an exhaust gas turbocharger of the internal combustion engine.

In a further refinement, the exhaust gas line projects with at least one outlet into the exhaust pipe. This ensures a good intermixing of the gas streams meeting one another. For this purpose, the exhaust gas line is preferably introduced concentrically into the exhaust pipe so that the outlet from the exhaust gas line is arranged in the direction of flow of the process exhaust gas stream, that is to say, for example, of the internal combustion engine exhaust gas stream. An increase in the flow velocity of the process exhaust gas is thereby achieved, thus ensuring a rapid full mixing of the gas mixture consisting of burner exhaust gas and of evaporated fuel with the process exhaust gas. As a result, an ignition of the gas mixture can be prevented even when the process exhaust gas contains oxygen. In order further to prevent occurrence of chemical reactions in the region of introduction, appropriate aids which assist this may be provided. Such possible aids are, for example, a plate or a cone arranged in front of the outlet of the exhaust gas line, the cone apex being oriented towards the outlet of the exhaust gas line. There is also additionally or alternatively provision whereby, for further increasing the flow velocity in the region of the outlet, a flow narrowing in the exhaust pipe, for example in the form of a Venturi device or Venturi tube, is provided. In other words, a possible reaction of the burner exhaust gas, prepared with evaporated fuel, with the process exhaust gas is to be quenched.

In a development of the invention, a gas-conducting device carrying process exhaust gas issues into the exhaust gas line. As a result, process exhaust gas is delivered to the burner exhaust gas and to the evaporating fuel. The burner exhaust gas (in the case of delivery in the direction of flow, an injection device) is thereby cooled in a controlled manner, specifically such that sufficient power is still provided for evaporating the injected fuel, but the ignition of the latter is prevented. However, delivery may also take place in the region of the injection device or downstream of the latter in the direction of flow. By suitable choice of the aids described, the chemical reactions of the fuel with the burner exhaust gas and/or with the process exhaust gas can be promoted or prevented, as required. Particularly by the temperature being influenced in the region of the injection device, it is possible, by reactions of the injected fuel with the burner exhaust gas, to generate in a directed manner substances which assist desired reactions in the following diesel oxidation catalyst.

The structural configurations described above are employed expediently for implementing the further embodiment, described below, of the operating method according to the invention.

In the method for operating an exhaust gas aftertreatment system according to the invention for an internal combustion engine, the injected hydrocarbons in the device are at least partially evaporated and are modified chemically by crack reactions and/or by partial oxidation, a burner (2), as an integral part of the device, making available a basic thermal power, the lower limit of which is stipulated by the provision of a sufficient energy quantity for the evaporation of a hydrocarbon quantity introduced into an exhaust gas line (4) of the burner (2) via an injection device (5).

A catalytically acting coating is preferably arranged at least in a part-region of the treatment device having an oxidizing action, the platinum fraction, at least in a part-region of the catalytic coating of the components, amounting to less than 50% of the overall mass of all the catalytically active substances in this part-region of the coating. Further preferably, the burner (2) furnishes a thermal power additionally heating the process exhaust gas to a stipulated temperature.

Thus, the burner can be operated in a lambda range of 0.75 to 1.75, preferably of 0.9 to 1.1. Furthermore, the burner is designed so that it can be used in a power range which corresponds to approximately 1-25%, preferably 2-20% and particularly preferably 2.5-15% of the rated engine power. One aim of the invention is to operate the burner with as low a power as possible, because, in particular, the required air-conveying device for the delivery of (combustion) air can then be configured relatively simply.

Furthermore, by virtue of the method according to the invention, in a general form, the injected fuel (if appropriate, with a direct addition of a part-quantity of process exhaust gas) is evaporated by the burner exhaust gas and, together with the burner exhaust gas and the overall quantity of the process exhaust gas, is conducted into the exhaust gas aftertreatment device, in order to bring about the reactions intended there. In this case, the injected fuel, together with the burner exhaust gas and the process exhaust gas, is delivered via the exhaust pipe to the catalyst, in particular to a diesel oxidation catalyst and a following particle filter and is oxidized in the catalyst (diesel oxidation catalyst) and/or in the particle filter which, if appropriate, is additionally also catalytically coated. A particular advantage of this configuration is that the oxidation reaction therefore takes place only in the catalyst (diesel oxidation catalyst) and, consequently, the temperatures necessary for the regeneration of the particle filter are generated only here. If the injected fuel were already ignited at the location of introduction to the exhaust gas line, this would entail a higher thermal load upon the overall exhaust system, and considerable heat losses would have to be compensated by larger fuel quantities.

The critical advantage of the proposed system is that the hydrocarbons, modified by evaporation and/or chemical modification, in the catalyst (diesel oxidation catalyst) or in the coated particle filter or the combination of these undergo chemical reactions which differ at least partially from those of conventional systems. This is the reason for the replacement, possible according to the invention, of platinum by palladium.

In the catalyst (diesel oxidation catalyst) or in the coated particle filter or in the combination of these, for example, a temperature of up to 650° C., required for the regeneration of particle filters, is generated as a result of the oxidation of the injected fuel. In a further refinement of the method, a part-quantity of the injected fuel quantity is oxidized with the process exhaust gas, so as to release heat, within the exhaust gas line and/or the location of combustion. As a result, the overall thermal power can be increased, with the burner power set at minimum, to an extent such that a reliable operation of the catalyst (diesel oxidation catalyst) or of the coated particle filter or of the combination of these takes place. In order to start its activity, that is to say in order to start a catalytic reaction of the evaporated fuel introduced, the catalyst (diesel oxidation catalyst) or the coated particle filter or the combination of these must reach a stipulated minimum temperature, for example 300° C. This temperature is achieved by the summing of the burner power and of the power which is generated by the burnt part-quantity.

In a further refinement, the oxidized part-quantity of the injected fuel quantity is kept at least approximately constant independently of the overall injected fuel quantity. In this case, furthermore, there is provision whereby, after a limit quantity of the partially converted fuel quantity is overshot, the part-conversion is terminated and the fuel is evaporated overall. These different effects are achieved by means of a strict control of the combustion-air ratio in the burner and/or a strict control of the quantity of atomization air, delivered in the event of the use of an airstream atomizer nozzle, for the airstream atomizer nozzle. Further influencing variables are the location of mounting of the issue of the introduction device and the delivery of a part-quantity of process exhaust gas (for cooling the burner exhaust gas and consequently the evaporation liquid), likewise taking into account the delivery location.

Further advantageous refinements of the invention may be gathered from the drawing description in which exemplary embodiments of the invention which are illustrated in the figures are described in more detail. In the drawing.

Figure 1:
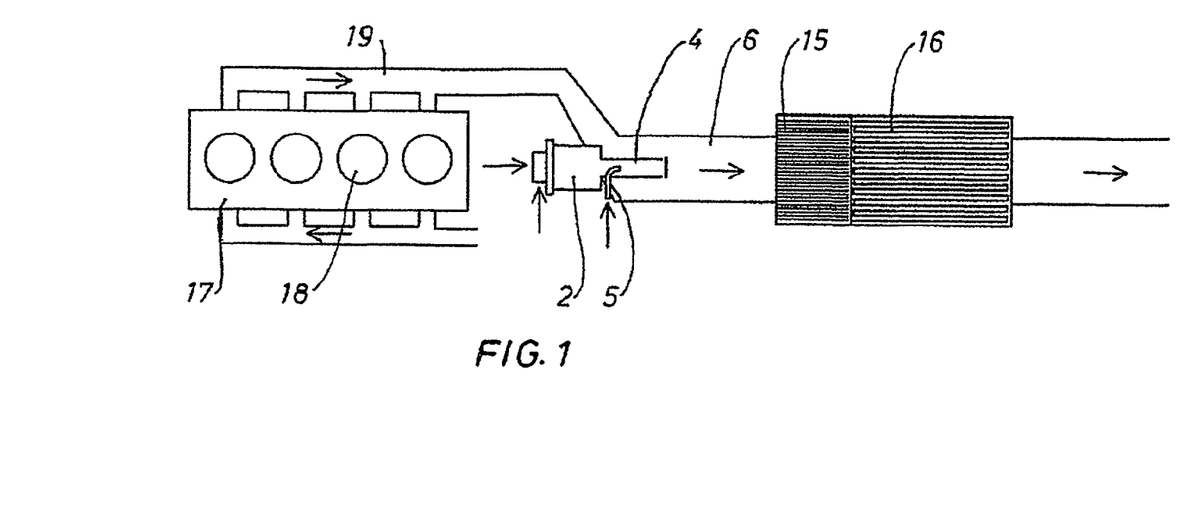
FIG. 1 shows a diagrammatic illustration of an overall illustration of the exhaust gas aftertreatment system for an internal combustion engine.

The system illustrated in FIG. 1 has an internal combustion engine 17 which, in particular, is a diesel internal combustion engine. The internal combustion engine 17 has delivered to it diesel fuel and air which are burnt in the four cylinders 18 illustrated and set the crankshaft in rotational movement via the pistons, movable in the cylinders, and via connecting rods. The exhaust gases burnt in the cylinders 18 are conducted into an exhaust pipe 6 via a collecting pipe 19. An exhaust gas line 4 of a burner 2 projects into the exhaust pipe 6, an injection device 5 projecting into the exhaust gas line 4. As also explained overall below, fuel and air are delivered to the burner 2, while liquid fuel is injected into the exhaust gas line 4 via the injection device 5. The system consisting of the burner 2, of the injection device 5 and of the exhaust gas line 4 is called an evaporator device below. A diesel oxidation catalyst 15 and a particle filter 16 are installed in the exhaust pipe 6 downstream of the issue of the exhaust gas line 4. The soot particles which, in particular, are filtered out of the process exhaust gas of the internal combustion engine 17 by the particle filter 16 are burnt with the aid of the heat generated in the exhaust gas aftertreatment system.

Figure 3:
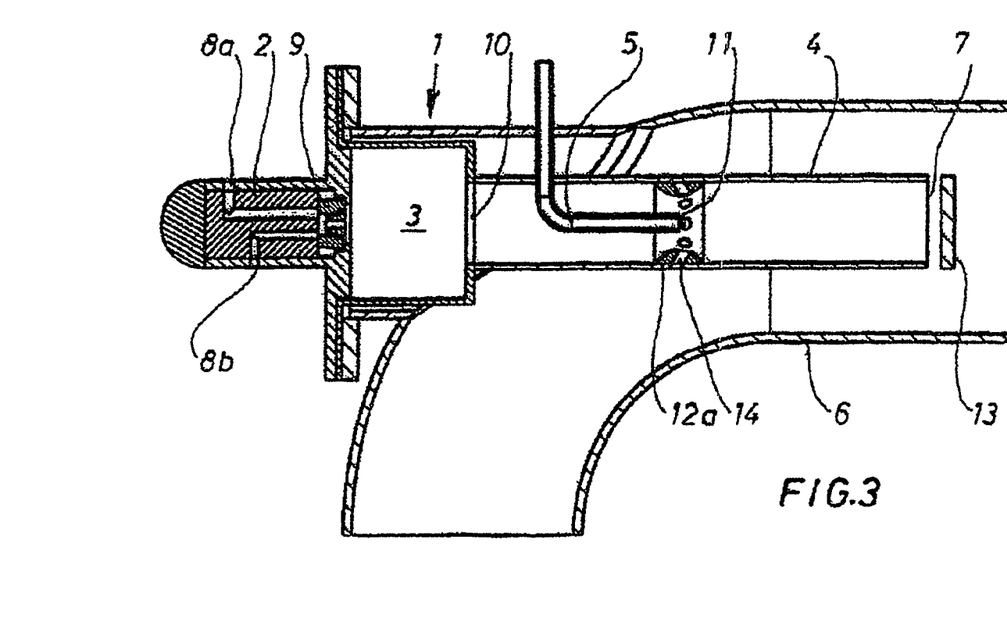
FIG. 3 shows a second version of the evaporator device cooperating with an exhaust pipe.
Figure 4:
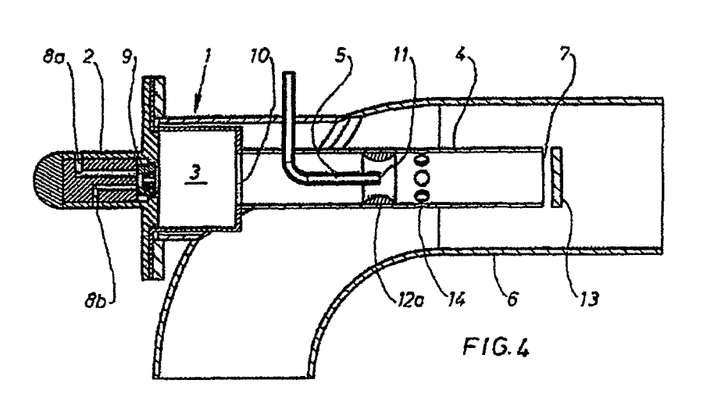
FIG. 4 shows a third version of the evaporator device cooperating with an exhaust pipe.

The evaporator device according to FIGS. 2 to 4 has, in all versions, a housing 1, into which the burner 2, a combustion chamber 3, the exhaust gas line 4 and the injection device 5 for a liquid fuel are integrated. In this case, likewise in all versions, the housing 1 is connected to the exhaust pipe 6 so that the exhaust gas line 4 is introduced with an outlet 7 concentrically into the exhaust pipe 6 and the outlet 7 is arranged in the direction of flow of the process exhaust gas flowing through the exhaust pipe 6.

The burner 2 has a supply device 8a for a gaseous or liquid fuel and a supply device 8b for air. The fuel and air are mixed with one another in a suitable way and, for example, introduced via an airstream atomizer nozzle 9 into the combustion chamber 3, and the mixture is burnt in the combustion chamber 3. For this purpose, the mixture is suitably ignited in the burner 2 and/or the combustion chamber 3. In order to keep the heat losses low, the combustion chamber 3 is inserted, as largely insulated as possible, into the housing 1. The combustion chamber 3 has an outlet port 10, through which the burner exhaust gas enters the exhaust gas line 4 and flows along the exhaust gas line 4 as far as the outlet 7, in order to be intermixed there with the process exhaust gas which flows in the exhaust pipe 6 and which is internal combustion engine exhaust gas. The mixture of fuel and air is set so that the oxidation reactions are largely concluded in the region of the outlet port 10 from the combustion chamber 3 and consequently a heated exhaust gas stream flows into the exhaust gas line 4. The injection device 5 issues with an issue 11 into the exhaust gas line 4 preferably concentrically with respect to the exhaust gas line 4. Arranged at the location of the issue 11 is an atomizer nozzle, by means of which the liquid fuel delivered via the injection device 5 is finely atomized. The fuel thus introduced is consequently heated and evaporated. In the region of the issue 11, a Venturi device 12a is inserted into the exhaust gas line 4. The Venturi device 12a causes an additional intermixing of the evaporation liquid with the exhaust gas. In the region of the outlet 7 is arranged a quenching device 13 which, in the exemplary embodiment, is designed as a baffle plate and causes a full mixing of the exhaust gas, flowing out of the outlet 7 and mixed with the evaporated evaporation liquid, with the process exhaust gas. At the same time, the quenching device 13 may be employed in order to avoid an ignition of the overall mixture arising here. For an increase in the flow velocity of the process gas stream, a Venturi device 12b is installed in the exhaust pipe 6 in the region of the outlet 7 or of the quenching device 13.

The overall mixture formed in the way described is then delivered to an exhaust gas aftertreatment device which has a catalyst catalytically reducing nitrogen oxides selectively and/or a NO storage catalyst and/or a diesel oxidation catalyst 15 and a particle filter 16.

The version according to FIG. 3 differs from the version according to FIG. 1 in that, here, a gas-conducting device 14 in the form of bores arranged on the circumference of the exhaust gas line 4 and issuing approximately in the centre of the Venturi device 12a is additionally arranged in the region of the Venturi device 12a. A part-quantity of process exhaust gas is introduced into the exhaust gas line 4 through this gas-conducting device 14. However, in this version, no Venturi device 12b is installed in the region of the issue 11.

The version according to FIG. 4 differs from the version according to FIG. 2 in that the gas-conducting device 14 is incorporated here into the exhaust gas line 4 in the region downstream of the Venturi device 12a.

REFERENCE SYMBOLS

1 Housing
2 Burner
3 Combustion chamber
4 Exhaust gas line
5 Injection device
6 Exhaust pipe
7 Outlet
8a, 8b Supply device
9 Airstream atomizer nozzle
10 Outlet port
11 Issue
12a, 12b Venturi device
13 Quenching device
14 Gas-conducting device
15 Diesel oxidation catalyst
16 Particle filter
17 Internal combustion engine
18 Cylinder
19 Collecting pipe

EXAMPLES

Catalyst A

According to the Invention

Diesel oxidation catalyst (DOC) with 60 g/ft$^3$ Pd on a cordierite substrate having the dimensions D9.5"×L4.5", the cell density 300 cpsi and the wall thickness 5 mil. The catalyst was produced by impregnating an aluminum oxide (BET surface area 160 m$^2$/g) with palladium nitrate solution and applying the impregnated oxide with a load of 130 g/L to the substrate and subsequent drying and heat treatment. The catalyst was then aged under air for 16 h at 700° C. in a furnace.

Catalyst B

According to the Invention

Catalytically coated filter (CDPF) with in total 25 g/ft$^3$ Pd on a cordierite surface filter substrate having the dimensions D9.5"×L12", the cell density 200 cpsi and the wall thickness 12 mil. The palladium content in the region 5 inches proceeding from the inlet is 46 g/ft$^3$, and in the remaining region is 10 g/ft$^3$.

Catalyst C

According to the Invention

DOC with 40 g/ft$^3$ mass fraction Pt:Pd of 1:4 on a cordierite substrate having the dimensions D9.5"×L4.5", the cell density 300 cpsi and the wall thickness 5 mil. The catalyst was produced by impregnating an aluminosilicate (BET surface area 150 m$^2$/g, 5% SiO$_2$) with palladium and platinum nitrate solution and applying the impregnated oxide with a load of 130 g/L to the substrate and subsequent drying and heat treatment. The catalyst was then aged under air for 16 h at 700° C. in a furnace.

Catalyst D

According to the Invention

DOC with 30 g/ft$^3$ mass fraction Pt:Pd of 1:2 on a cordierite substrate having the dimensions D9.5"×L4.5", the cell density 300 cpsi and the wall thickness 5 mil. The catalyst was produced by impregnating an aluminosilicate (BET surface area 150 m$^2$/g, 5% SiO$_2$) with palladium and platinum nitrate solution and applying the impregnated oxide with a load of 130 g/L to the substrate and subsequent drying and heat treatment. The catalyst was then aged under air for 16 h at 700° C. in a furnace.

Catalyst E

Not According to the Invention

DOC with 30 g/ft$^3$ mass fraction Pt:Pd of 2:1 on a cordierite substrate having the dimensions D9.5"×L4.5", the cell density 300 cpsi and the wall thickness 5 mil. The catalyst was produced by impregnating an aluminosilicate (BET surface area 150 m$^2$/g, 5% SiO$_2$) with palladium and platinum nitrate solution and applying the impregnated oxide with a load of 130 g/L to the substrate and subsequent drying and heat treatment. The catalyst was then aged under air for 16 h at 700° C. in a furnace.

System Setup:
Engine: Deutz Tier III TCD 2012 L06-4
Burner: 10 kW heating power (diesel fuel supply) with secondary introduction of diesel into the burner flame
The catalysts are each equipped with 10 thermocouples T5.1i to T5.10i and, respectively, T5.1o to T5.10o at a depth of 1 inch from the inlet and outlet side of the catalyst.

Test Procedure:

After the catalyst system has been conditioned for 30 minutes under full load, the desired engine operating point (EOP) is set and the burner is switched on with a power of 10 kW. The exhaust gas mass flow rate MFR is produced. Once the temperature at the DOC inlet has leveled off at the target value T5.0, secondary diesel fuel is injected into the flame of the burner in a quantity such as to achieve a target temperature of 650° C. under adiabatic conditions with complete combustion. The introduction of the fuel is kept constant for 8 minutes and then stopped again. The temperatures upstream, downstream and in the catalyst and also the quantity of HC downstream of the catalyst HC_out are recorded. Then, a new engine operating point is started up with the burner switched on. After the DOC inlet temperature has stabilized, an appropriate quantity of diesel fuel is again introduced into the burner flame, and the measurement takes place. This is repeated for each further operating point.

Results (A, B, C, D, E) Characterize the Results for the Different Catalysts

It can be seen that, as the platinum fraction decreases, the slip of hydrocarbons (HC_out) decreases and the mean value of the temperatures in the inlet region of the catalyst (Ø T5.xi) increases. To this end, the measured values of the individual thermocouples over the last 20 s of the regeneration cycle were averaged, and in turn the overall average value was formed therefrom. The standard deviation of these temperature measurement points within the last 20 s of the regeneration cycle (□T5.xi) is smaller in the case of low-platinum catalysts, which indicates more uniform combustion. These observations apply to a particular degree to the low inlet temperatures T5.0.

The catalysts according to the invention alone show a satisfactory performance with equivalent or lower costs compared to the variants which are not according to the invention.

On account of the integrated filter function and the considerably reduced loading, catalyst B assumes a separate position. The lower loading and the higher thermal mass and smaller surface area of the filter substrate have the effect that the combustion starts up less effectively and proceeds more inhomogeneously within the inlet region monitored. Thus, the average temperature ø T5.xi achieved in the inlet is considerably reduced by comparison and the standard deviation is greater. The target temperature of 600 or 650° C. is already achieved, however, in the front part of the filter. Further tests with additional, more intense aging (16 h at 800° C. in 80% N$_2$/10% O$_2$/10% H$_2$O) show that this distinction becomes visible to an even greater extent.

The invention claimed is:

1. An exhaust gas aftertreatment device for an internal combustion engine, comprising
    an introduction device comprising a burner, a fuel-and-air supply device, a combustion chamber, an exhaust gas line, an injection device for injecting hydrocarbons into the exhaust gas line, and an outlet, wherein
    the injection device is configured to inject a quantity of hydrocarbons that is injected separately from any fuel output by the fuel-and-air supply device,
    the introduction device is configured to at least partially evaporate and chemically modify the hydrocarbons injected from the injection device by at least one of crack reactions and partial oxidation, while suppressing ignition of the injected hydrocarbons,

| EOP | MFR | T5.0 | HC_out [ppm C3] | | | | | Ø T5.xi [° C.] | | | | | σ T5.xi [° C.] | | | | |
|---|---|---|---|---|---|---|---|---|---|---|---|---|---|---|---|---|---|
| min$^{-1}$ | Nm | Kg/h °C. | A | B | C | D | E | A | B | C | D | E | A | B | C | D | E |
| 1910 | 200 | 420 300 | 218 | 127 | 247 | 314 | 3588* | 537 | 420 | 531 | 513 | 292* | 8.2 | 34 | 11.7 | 17.0 | 4.5* |
| 1635 | 295 | 425 320 | 207 | 96 | 221 | 260 | 598 | 570 | 492 | 586 | 573 | 466 | 8.5 | 17 | 9.8 | 11.7 | 73.4 |
| 1550 | 345 | 430 340 | 194 | 103 | 214 | 247 | 495 | 577 | 509 | 590 | 587 | 560 | 7.9 | 15 | 9.3 | 10.4 | 20.1 |
| 1470 | 390 | 430 360 | 179 | 107 | 195 | 226 | 432 | 590 | 525 | 596 | 592 | 587 | 7.6 | 14 | 9.0 | 10.0 | 5.5 |

*Complete collapse of the catalyst activity

| Catalyst | Relative costs |
|---|---|
| A | 100% |
| C | 107% |
| D | 100% |
| E | 150% |

The relative costs were determined on the basis of the price ratio between platinum and palladium, averaged over 5 years, of about 4. Catalyst B is not comparable since here the filter function is also integrated.

the introduction device is configured for joining to an exhaust pipe carrying a process exhaust gas output from an internal combustion engine for introducing the at least partially evaporated and chemically modified hydrocarbons into the process exhaust gas, and the introduction device is free of a catalytic coating between at least the combustion chamber and the outlet.

2. The exhaust gas aftertreatment device according to claim 1, wherein an outlet of the injection device is arranged within the exhaust gas line.

3. The exhaust gas aftertreatment device according to claim 1, wherein an outlet of the injection device is arranged downstream from the combustion chamber.

4. An exhaust gas aftertreatment device for an internal combustion engine, comprising
an introduction device comprising a burner, a fuel-and-air supply device, a combustion chamber, an exhaust gas line, an injection device for injecting hydrocarbons into the exhaust gas line, and an outlet, wherein
the injection device is configured to inject a quantity of hydrocarbons that is injected separately from any fuel output by the fuel-and-air supply device,
the introduction device is configured to at least partially evaporate and chemically modify the hydrocarbons injected from the injection device by at least one of crack reactions and partial oxidation, while suppressing ignition of the injected hydrocarbons,
the introduction device is configured for joining to an exhaust pipe carrying a process exhaust gas output from an internal combustion engine for introducing the at least partially evaporated and chemically modified hydrocarbons into the process exhaust gas, and
the introduction device is configured to output the partially evaporated and chemically modified hydrocarbons, via the introduction device outlet, without the partially evaporated and chemically modified hydrocarbons having been reacted by a catalytic coating.

5. The exhaust gas aftertreatment device according to claim 4, further comprising
a Venturi device arranged in the exhaust gas line in the region of an outlet of the injection device, the arrangement of the Venturi device being one that promotes intermixing of hydrocarbons injected from the injection device with a burner exhaust gas while suppressing ignition thereof.

6. The exhaust gas aftertreatment device according to claim 4, wherein an outlet of the injection device is arranged within the exhaust gas line.

7. The exhaust gas aftertreatment device according to claim 4, wherein an outlet of the injection device is arranged downstream from the combustion chamber.

8. An exhaust gas aftertreatment system for an internal combustion engine, comprising
an introduction device for introducing hydrocarbons into an exhaust pipe carrying a process exhaust gas output from an internal combustion engine, and
a treatment device downstream of an outlet of the introduction device, the treatment device configured for the process exhaust gas to flow therethrough and to increase the process exhaust gas temperature by oxidation of hydrocarbons introduced from the introduction device, wherein
the introduction device comprises a burner, a fuel-and-air supply device, a combustion chamber, an exhaust gas line, an injection device for injecting hydrocarbons into the exhaust gas line, and the outlet that opens into the exhaust pipe,
the treatment device comprises at least one catalytically coated component, the catalytic coating comprising a platinum fraction that, at least in a part-region of the catalytic coating, amounts to less than 50% of the overall mass of all catalytically active substances in the part-region of the catalytic coating,
the injection device is configured to inject a quantity of hydrocarbons that is injected separately from any fuel output by the fuel-and-air supply device,
the introduction device is configured to at least partially evaporate and chemically modify the hydrocarbons injected from the injection device by at least one of crack reactions and partial oxidation, while suppressing ignition of the injected hydrocarbons, and
the system is configured such that the hydrocarbons partially evaporated and chemically modified by the introduction device first contact a catalytic coating while in the presence of process exhaust gas output from the internal combustion engine.

9. The exhaust gas aftertreatment system according to claim 8, wherein the part-region of the catalytic coating of the at least one catalytically coated component of the treatment device comprises at least 20% of the overall mass of the catalytic coating on the at least one catalytically coated component.

10. The exhaust gas aftertreatment system according to claim 8, wherein the part-region comprises an entirely catalytically coated component, a partially catalytically coated component, or a plurality of catalytically coated components.

11. The exhaust gas aftertreatment system according to claim 8, wherein the part-region comprises a zonal coating of a catalytically coated component, the zonal coating comprising a front section of the catalytically coated component in a flow direction of the process exhaust gas.

12. The exhaust gas aftertreatment system according to claim 8, wherein a Venturi device is arranged in the exhaust gas line in the region of an outlet of the injection device.

13. The exhaust gas aftertreatment system according to claim 8, further comprising the exhaust pipe, wherein
the burner, the exhaust gas line, and the injection device are arranged as an integrated housing, and
the housing is joined to the exhaust pipe.

14. The exhaust gas aftertreatment system according to claim 8, wherein a quenching device, a Venturi device, or a combination thereof, is present in the region of the introduction device outlet.

15. The exhaust gas aftertreatment system according to claim 8, further comprising a gas-conducting device having an outlet for issuing process exhaust gas into the exhaust gas line at a location upstream of the introduction device outlet.

16. The exhaust gas aftertreatment system according to claim 8, wherein
the platinum fraction, at least in the part-region of the catalytic coating, amounts to less than 5% of the overall mass of all catalytically active substances, at least in a part-region of the treatment device.

17. The exhaust gas aftertreatment system according to claim 8, wherein a Venturi device is arranged in the exhaust gas line in the region of an outlet of the injection device, and a Venturi device is arranged in the region of the introduction device outlet.

18. The exhaust gas aftertreatment system according to claim 8, wherein the injection device has an atomizer nozzle.

19. The exhaust gas aftertreatment system according to claim 18, wherein
the atomizer nozzle of the injection device is a pressurized atomizer nozzle, or an airstream atomizer nozzle.

20. The exhaust gas aftertreatment system according to claim 8, further comprising the exhaust pipe, wherein
the exhaust gas line projects into the exhaust pipe, with the introduction device outlet positioned in the exhaust pipe.

21. The exhaust gas aftertreatment system according to claim 20, wherein the exhaust gas line is introduced concentrically into the exhaust pipe with the introduction device outlet arranged for introducing hydrocarbons into the exhaust pipe in a flow direction of the process exhaust gas through the exhaust pipe.

22. The exhaust gas aftertreatment system according to claim 8, wherein
the at least one catalytically coated component comprises a catalyst substrate, a particle filter, or a combination thereof.

23. The exhaust gas aftertreatment system according to claim 22, wherein
the catalytic coating of the at least one catalytically coated component comprises a unitary coating, a zonal coating, or a combination thereof.

24. The exhaust gas aftertreatment system according to claim 23, wherein
the at least one catalytically coated component comprises both a catalytically coated catalyst substrate and a catalytically coated particle filter downstream of the catalyst substrate, and
the catalytic coating of at least the catalyst substrate is configured to oxidize a quantity of partially evaporated and chemically modified hydrocarbons output from the introduction device, to thereby increase the process exhaust gas temperature to a temperature necessary for the regeneration of the particle filter.

25. The exhaust gas aftertreatment system according to claim 8, wherein the catalytic coating of the part-region comprises a noble metals fraction having a total noble metal mass, based on the at least one catalytically coated component volume, in the range from 0.1-10 g/L.

26. The exhaust gas aftertreatment system according to claim 25, wherein the noble metals fraction amounts, in the overall mass of all catalytically active substances of the part-region of the treatment device, to more than 10%.

27. The exhaust gas aftertreatment system according to claim 25, wherein the catalytic coating comprises a palladium fraction that amounts to at least 50% of the overall mass of all noble metals in the part-region of the treatment device.

28. The exhaust gas aftertreatment system according to claim 25, wherein the platinum content of the catalytic coating of the part-region amounts to less than 1% of the overall mass of all catalytically active substances of the part-region of the treatment device.

29. A method for operating an exhaust gas aftertreatment system for an internal combustion engine according to claim 8, comprising
injecting hydrocarbons into the exhaust gas line from the injection device;
generating a basic thermal power with the burner, the basic thermal power having a lower limit sufficient to supply an energy quantity for evaporating a hydrocarbon quantity; and
at least partially evaporating and chemically modifying a quantity of hydrocarbons injected from the injection device by at least one of crack reactions and partial oxidation, while also suppressing ignition of the hydrocarbon quantity.

30. The method according to claim 29, further comprising oxidizing, by the catalytically active coating of the part-region of the treatment device, a quantity of the hydrocarbons injected from the injection device after the injected hydrocarbons have been at least partially evaporated and chemically modified.

31. The method according to claim 29, further comprising furnishing, by the burner, a basic thermal power sufficient to additionally heat the process exhaust gas to a stipulated temperature.

* * * * *